United States Patent
Pause

(10) Patent No.: US 12,522,041 B2
(45) Date of Patent: Jan. 13, 2026

(54) LOCKING CONTROL METHOD FOR A PIVOT AXLE, A PIVOT AXLE LOCKING CONTROLLER AND A PIVOT AXLE LOCKING SYSTEM

(71) Applicant: VOLVO CONSTRUCTION EQUIPMENT AB, Eskilstuna (SE)

(72) Inventor: Valentin Pause, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 18/664,478

(22) Filed: May 15, 2024

(65) Prior Publication Data

US 2024/0424852 A1 Dec. 26, 2024

(30) Foreign Application Priority Data

Jun. 23, 2023 (EP) .................................. 23181187

(51) Int. Cl.
*B60G 17/016* (2006.01)
*B60G 9/02* (2006.01)
*B60G 17/005* (2006.01)

(52) U.S. Cl.
CPC ............. *B60G 17/016* (2013.01); *B60G 9/02* (2013.01); *B60G 17/005* (2013.01);
(Continued)

(58) Field of Classification Search
CPC ...... B60G 17/016; B60G 9/02; B60G 17/005; B60G 2200/322; B60G 2204/46; B60G 2400/0533; B60G 2400/106; B60G 2400/204; B60G 2400/63; B60G 2400/95; B60G 2500/00; B60G 2600/181; B60G 2600/70; B60G 2800/012; B60G 2800/9122; B60G 17/056;
(Continued)

(56) References Cited

U.S. PATENT DOCUMENTS

| 6,082,742 A * | 7/2000 | Ishikawa .................. B66F 9/24 280/124.112 |
| 12,024,856 B2 * | 7/2024 | Hayashi ............... B60G 17/005 |

FOREIGN PATENT DOCUMENTS

| EP | 0884202 A2 | 12/1998 |
| EP | 0884202 A3 | 3/1999 |

(Continued)

OTHER PUBLICATIONS

Extended European Search Report, European Application No. 23181187.8, mailed Feb. 6, 2024, 5 pages.

*Primary Examiner* — Xiao En Mo
(74) *Attorney, Agent, or Firm* — Sage Patent Group

(57) ABSTRACT

Aspects of the present disclosure relate to a locking control method for a pivot axle of a wheeled working machine including: determining, using a multibody simulation model, a current posture and motion state of the working machine and static and dynamic forces acting on the working machine; determining a relevant tipping line based on a current locking status of a pivot axle of the working machine; calculating torques acting on the working machine based on the information on current posture, motion state, static and dynamic forces; determining a control command for a pivot axle locking mechanism of the working machine based on the calculated torques and the tipping line; and providing the control command to a pivot axle locking mechanism.

15 Claims, 3 Drawing Sheets

(52) U.S. Cl.
CPC .... *B60G 2200/322* (2013.01); *B60G 2204/46* (2013.01); *B60G 2400/0533* (2013.01); *B60G 2400/106* (2013.01); *B60G 2400/204* (2013.01); *B60G 2400/63* (2013.01); *B60G 2400/95* (2013.01); *B60G 2500/00* (2013.01); *B60G 2600/181* (2013.01); *B60G 2600/70* (2013.01); *B60G 2800/012* (2013.01); *B60G 2800/9122* (2013.01)

(58) Field of Classification Search
CPC ........ B60G 2300/082; B60G 2300/083; B60G 2300/09; B60G 2200/32; B60G 2204/4605; B60G 2300/06; B60G 17/01908; B60G 2400/0511; B60G 2400/0521; B60G 2400/0531; B60G 2400/50; B60G 2800/0194; B62D 49/085; E02F 9/2257; E02F 9/265; E02F 9/04; B60T 1/005
See application file for complete search history.

(56) References Cited

FOREIGN PATENT DOCUMENTS

| | | |
|---|---|---|
| EP | 2444304 A1 | 4/2012 |
| EP | 3988719 A1 | 4/2022 |

\* cited by examiner

LOCKING CONTROL METHOD FOR A PIVOT AXLE, A PIVOT AXLE LOCKING CONTROLLER AND A PIVOT AXLE LOCKING SYSTEM

CROSS REFERENCE TO RELATED APPLICATIONS

This application claims priority to European Patent Application No. 23181187.8, filed on Jun. 23, 2023, the disclosure and content of which is incorporated by reference herein in its entirety.

TECHNICAL FIELD

The present disclosure relates to a locking control method for a pivot axle for a wheeled working machine, a pivot axle locking controller and a pivot axle locking system for such a working machine.

The present disclosure can be applied in wheeled working machines, such as excavators, telehandlers, off-road cranes or wheel loaders with pivot axle or tractors or combine harvesters. Although the present disclosure will be described mainly with respect to an excavator, the present disclosure is not restricted to this particular vehicle, but may also be used in other wheeled vehicles such as telehandlers, off-road cranes or wheel loaders with pivot axle or tractors or combine harvesters.

BACKGROUND

The purpose of a pivot axle at a wheeled working machine is to allow rotation of the front axle by angles of up to for example 9° to improve traction in uneven terrain. A sometimes hydraulic locking mechanism allows to lock the rotation of the axle making it behave as a rigid mounted axle e.g., for lifting operations or when digging. The machine's tipping stability varies highly between the unlocked and locked state of the pivot axle due to the variation of tipping lines. While in today's application the pivot axle is automatically closed when the machine is not driving, the operator has to manually close the axle by the push of a button on the joystick, when he is driving with the machine and anticipates that he will need more side stability e.g., because he is swinging over the side of the machine with a heavy load or tool attached the machine. Alternatively, he can select the axle to be closed at all times with a switch in the console.

EP 2 444 304 B1 describes a method of preventing the overturning of a vehicle by locking the front axle. Therein it is described to use pitch and roll angle compared with threshold values for those angles as intervention initialisation. Thus intervention takes not place until the threshold value is reached. Thus existing solutions comprise mainly automatic locking of the pivot axle when the machine is not driving and an auto digging brake is engaged or when a certain rotation angle of a superstructure is exceeded.

SUMMARY

An object of the present disclosure is to provide an improved locking control, which allows for automatically closing of the pivot axle based on a current situation in a safe manner.

According to a first aspect of the present disclosure the object is achieved by a locking control method according to claim 1. The locking control method for a pivot axle of a wheeled working machine comprises the steps:

determining a current posture and motion state of the working machine and static and dynamic forces acting on the working machine, e.g., using a multibody simulation model determining a relevant tipping line based on a current locking status of a pivot axle of the working machine;

calculating torques acting on the working machine based on the information on current posture, motion state, static and dynamic forces;

determining a control command for a pivot axle locking mechanism of the working machine based on the calculated torques and the tipping line; and providing the control command to the pivot axle locking mechanism.

Aspects of the present disclosure are based on the recognition that by calculation torques acting on the working machine and determining the control command based on the calculated torques an earlier intervention or warning is possible, as intervention can already take place when an acting straight line of the resultant of all forces acting on the machine is approaching the limits of the tipping line from the safe (inner) side and avoid insecure situations.

Furthermore, aspects of the present disclosure further include the recognition that with calculating the torques and using them for the control signal disclosed subject matter herein allows for controlling the pivot axle locking without any feedback loop in an open control loop as there is no need to monitor the pivot axle. Therefore, controlling works without any control deviation or error signal. This is important for example in the case of an excavator's undampened pivot axle, since the machine tilts rapidly when the acting straight line of the resultant of all forces acting on the machine is crossing the resting polygon's limits.

Aspects of the present disclosure further improve travelling and working with wheeled working machines by allowing to automatically control the lock/unlock status of the pivot axle in all situations based on the static and dynamic stability of the machine. This comprises situations like for example object handling in uneven terrain where travelling and positioning of the load is required at the same time (e.g. swing over the side of the machine while driving), roadside hedge trimming with heavy tool, like a mulcher, ditch cleaning (machine drives along ditch in oftentimes uneven terrain, superstructure is rotated by 90° to the side, additional dipper arm attached for wider range with mowing bucket or other tool), abrupt steering when travelling fast with unlocked pivot axle. Pivot axle can then automatically be closed due to dynamic instability and all four wheels remain on ground providing traction, whereas the inner rear wheel would lift of the ground with an open pivot axle.

The automatic locking and unlocking of the pivot axle further assist the operator by automatically locking and unlocking the pivot axle, so that he can focus on other things. Additionally, aspects of the present disclosure allow pivot axle locking and unlocking in all situations also for autonomous wheeled working machines. In summary, aspects of the present disclosure allow for an early and fast intervention and thus safe operation in a broad range of situations and applications.

According to one embodiment of the locking control method determining a current posture and motion state of the working machine and static and dynamic forces comprises measuring swing angle and orientation of attachment parts of the working machine and calculating an overall centre of gravity. This embodiment is especially useful in applications with slow machine movements like slow travelling, slow swing speed and/or slow movement of an attachment. For this embodiment, a multi body simulation model would not be required. Instead, the position of the machine's overall centre of gravity can be obtained from the gravitational forces of the individual masses and the current position of their centre of gravity. This overall centre of gravity can then be referenced to the current tipping line to assess the torques acting on the machine and to determining the control command taking into account the overall centre of gravity and the current tipping line.

According to a further embodiment determining a current posture and motion state of the working machine and static and dynamic forces comprises measuring vehicle acceleration and/or angular accelerations of an upper carriage and/or attachment parts of the working machine, vehicle speed and/or angular speed of the upper carriage and attachment parts, orientation of the attachment parts, swing angle and brake pressure and provide these measurements to the multibody simulation model, e.g., angular acceleration, angular speed and orientation may be measured via at least one inertial measurement unit. The further sensor data like angular velocities and angular accelerations of the attachment parts and swing, as well as vehicle speed and brake pressure, allow the extension of the system's functionality to dynamic motions. In this embodiment, the use of a multi body simulation is favourable.

According to a further embodiment determining a current posture and motion state of the working machine comprises additionally measuring a pressure in a boom cylinder to determine a load attached. This allows for taking in account also the influence of the load on the static and dynamic forces. According to a further embodiment determining a control command comprises balancing the calculated torques around the relevant tipping line.

According to a further embodiment a hysteresis is applied before providing the control command to the pivot axle locking mechanism or wherein a hysteresis signal is provided to the pivot axle locking mechanism. While the method also functions without hysteresis, hysteresis is a technical measure to improve usability by avoiding frequent locking and unlocking when the machine's centre of gravity oscillates around the tipping line.

According to a second aspect of the present disclosure, the object is achieved by a pivot axle locking controller according to claim 7. The pivot axle locking controller is configured to perform the steps of the locking control method according to the first aspect of the present disclosure. In some embodiments, the locking controller is part of the machines ECU.

According to a third aspect of the present disclosure, the object is achieved by a computer program according to claim 8. The computer program comprising program code means for performing the steps of the locking control method according to the first aspect of the present disclosure when said program is run on a computer.

According to a fourth aspect of the present disclosure, the object is achieved by a computer readable medium 9. The computer readable medium carrying a computer program comprises program code means for performing the steps of the locking control method according to the first aspect of the present disclosure when said program product is run on a computer.

According to a fifth aspect of the present disclosure, the object is achieved by a pivot axle locking system 10. The pivot axle locking system comprises:

a pivot axle locking mechanism comprising a hydraulic locking valve (2), and a pivot axle locking controller according to the second aspect of the present disclosure.

According to an embodiment the pivot axle locking system further comprises at least one inertial measurement unit and a swing angle sensor, which are connected to the pivot axle locking controller. Those sensors may be preferred to measure vehicle acceleration and/or angular accelerations of an upper carriage and/or attachment parts of the working machine, vehicle speed and/or angular speed of the upper carriage and attachment parts, orientation of the attachment parts and swing angle. For vehicles, with no moving parts like a boom but with a pivot axle (e.g. tractors or combine harvesters) only one inertial measurement unit on the body would be sufficient. For vehicles like tele handlers, which do not necessarily have a rotating upper carriage, a body inertial measurement unit, one inertial measurement unit on the boom and pressure sensors on the boom cylinder would be sufficient to calculate the machine COG. With this information, the tipping stability of the machine can be increased by locking the pivot axle when the machine is operating on steep slopes. For wheeled working machines with moving parts, a rotating upper carriage, and several inertial measurement units on the body, an arm and attachment parts may be preferred.

According to a further embodiment the pivot axle locking system further comprises a pressure sensor in a boom cylinder of the working machine.

In some embodiments, the hydraulic locking valve is a solenoid valve. In some embodiments, the pivot axle locking system further comprises a proportional throttle valve. This improves operator comfort when switching between the locked and unlocked state of the pivot axle.

According to sixth aspect of the present disclosure, the object is achieved by a wheeled working machine according to claim 15. The wheeled working machine comprises a pivot axle locking system according to the fifth aspect of the present disclosure.

As to the advantages, various embodiments and details of the pivot locking controller, the computer program, the computer readable medium, the pivot axle locking system and the wheeled working machine reference is made to the corresponding aspects and embodiments described herein above with respect to the locking control method.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of aspects of the present disclosure cited as examples.

In the drawings.

DETAILED DESCRIPTION

Figure 1:
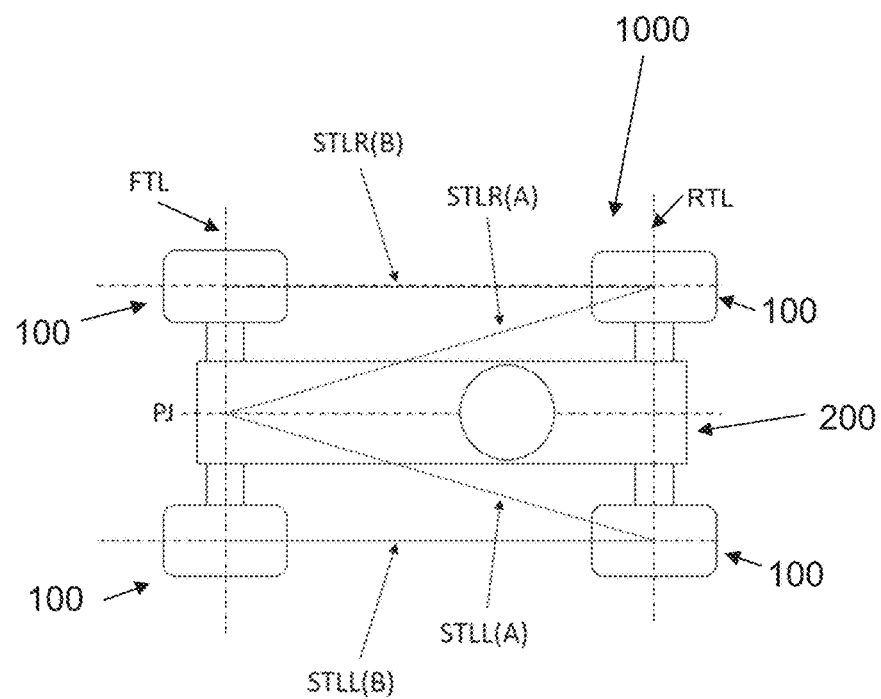
FIG. 1 is a schematic drawing of a wheeled working machine according to a sixth aspect of the present disclosure, indicating tipping lines of the wheeled working machine.

It is to be understood that the present disclosure is not limited to the embodiments described above and illustrated in the drawings; rather, the skilled person will recognize that many changes and modifications may be made within the scope of the appended claims.

Like reference character refer to like elements throughout the description.

FIG. 1 is a schematic drawing of a wheeled working machine 1000 according to a sixth aspect of the present disclosure indicating tipping lines of the wheeled working machine. The working machine 1000 has four wheels 100 and a main machine body 200. The two rear wheels are connected via a rigid rear axle, whereas the front wheels are connected via a pivot axle. The pivot axle's pivot joint PJ is arranged centrally. The front tipping line FTL and the rear tipping line RTL run along the respective axle. The machine's side tipping stability varies highly between the unlocked and locked state of the pivot axle due to the variation of the side tipping lines. If the pivot axle is locked and thus acts like a rigid axle the side tipping line left STLL(B) is a straight line between the centres of the left front and rear wheel. The side tipping line right STLR(B) is then a straight line between the centres of the right front and rear wheel. By unlocking the pivot axle the side tipping lines left and right change fundamentally. The side tipping line right STLR(A) and side tipping line left STLL(A) are then a straight line between the pivot joint PJ and the centers of the respective right or left rear wheel. In order to avoid tipping a center of gravity has to rest between the respective side tipping lines for the situation. The locking control method for a pivot axle of a wheeled working machine ensures that when the centre of gravity reaches a side tipping line in the pivot axle unlocked state the pivot axle is locked to enhance stability and on the other hand unlocks the pivot axle if the centre of gravity is between side tipping line right STLR(A) and side tipping line left STLL(A) to enhance traction in uneven terrain.

For this purpose the wheeled working machine comprises a pivot axle locking system comprising a pivot axle locking mechanism and a pivot axle locking controller, which is configured to perform the steps of a locking control method. The locking control method at first comprises determining a current posture and motion state of the working machine 1000 and static and dynamic forces acting on the working machine, e.g., using a multibody simulation model. Furthermore, a relevant tipping line (STLL(A), STLR(A) or STLL(B), STLR(B)) based on a current locking status of a pivot axle of the working machine is determined. Then torques acting on the working machine based on the information on current posture, motion state, static and dynamic forces are calculated and a control command for a pivot axle locking mechanism of the working machine based on the calculated torques and the tipping line is determined and then provided to a pivot axle locking mechanism. Herein determining a current posture and motion state of the working machine and static and dynamic forces comprises measuring vehicle acceleration and/or angular accelerations of an upper carriage and/or attachment parts of the working machine, vehicle speed and/or angular speed of the upper carriage and attachment parts, orientation of the attachment parts, swing angle and brake pressure and provide these measurements to the multibody simulation model, wherein angular acceleration, angular speed and orientation are measured via at least one inertial measurement unit. A more detailed description of the pivot locking control mechanism will be given with respect to FIG. 4.

Figure 2A:
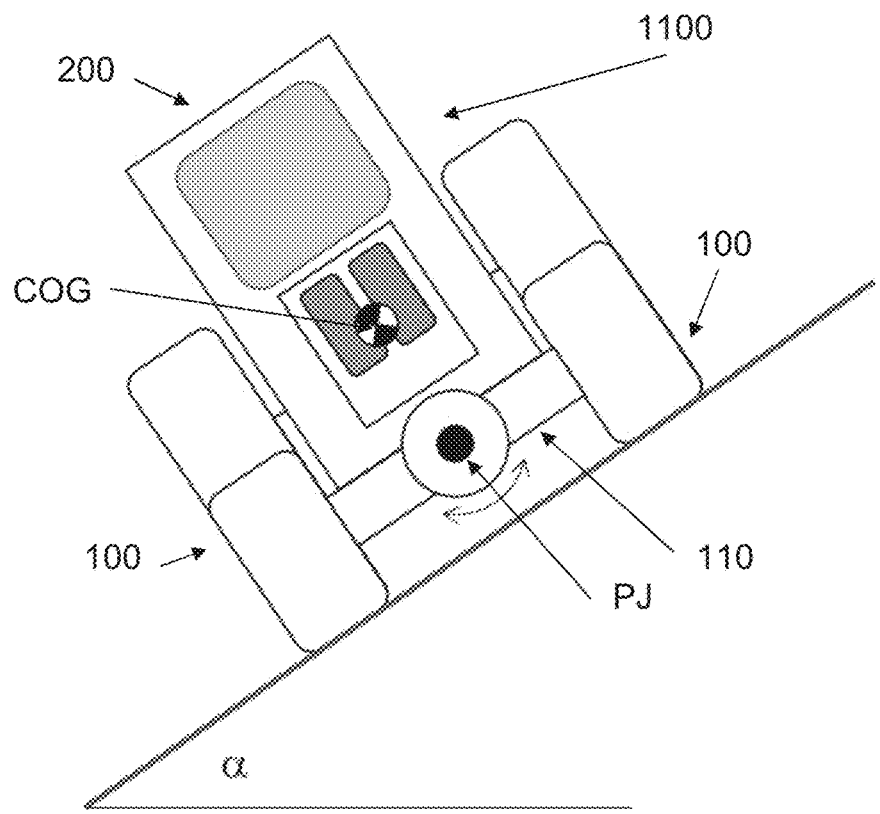
FIG. 2*a* is a schematic view of a tractor according to a sixth aspect of the present disclosure.
Figure 2B:
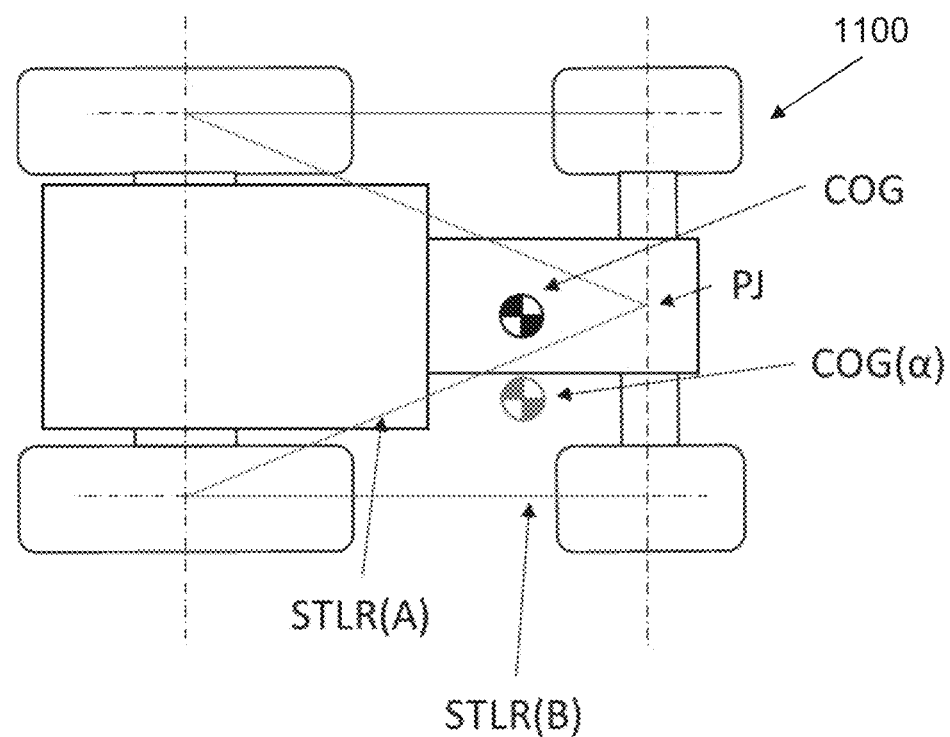
FIG. 2*b* is a schematic drawing indicating tipping lines of the tractor of FIG. 2*a*.

FIG. 2*a* is a schematic view of a tractor 1100 according to a sixth aspect of the present disclosure in a steep slope. The tractor 1100 is here operating at a steep slope with a slope angle α. The shown tractor 1100 has a pivot axle 110 between its front wheels 100 and a machine body 200. The centre of gravity COG is indicated. For vehicles, with no substructures movable in relation to a lower carriage like a boom but with a pivot axle (e.g. tractors or combine harvesters) like herein the use of only one inertial measurement unit on a body of the working machine would be sufficient to be able to lock the pivot axle with the claimed locking control method if the machine COG crosses the tipping line due to high slope angle. FIG. 2*b* is a schematic drawing indicating the side tipping lines on the right side of the tractor of FIG. 2*a*. Centre of gravity COG(α) indicates the tractor's COG projected to tipping pane under slope angle α. Thus with the relatively high slope angle the locking method control would automatically lock the pivot axle when the tractors are operating at such a steep slope.

Figure 3:
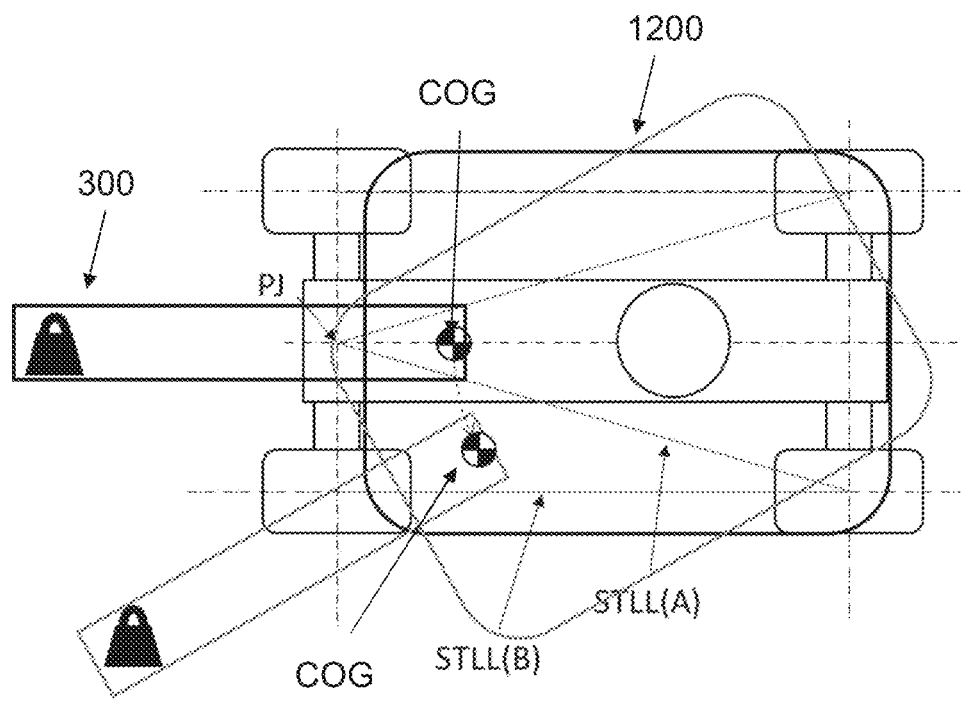
FIG. 3 is a schematic drawing of a further wheeled working machine according to a sixth aspect of the present disclosure.

FIG. 3 is a schematic drawing of a wheeled working machine 1200 according to a sixth aspect of the present disclosure. The wheeled working machine 1200 comprises a pivot axle locking system comprising a pivot axle locking mechanism and a pivot axle locking controller, which is configured to perform the steps of a locking control method like described with respect to FIG. 1. In contrast to FIG. 1 the wheeled working machine 1200 has a rotating superstructure 300, which is shown in two positions. As indicated the centre of gravity changes with movement of the superstructure. The locking control method uses a method of stability evaluation, which allows to control the locking status of the pivot axle based on the actual static and dynamic machine stability. The base of the locking control method is here a multibody simulation model which is running on the machines ECU that calculate the torque balance around the machine's critical tipping line. The torques evoked by all static and dynamic forces acting on the machine are summed up. As shown in FIG. 3 rotating the superstructure to either side can lead to the machine COG crossing the side tipping line STLL(A), the side tipping line for an unlocked pivot axle. In this situation the control algorithm would detect the COG approaching the side tipping line STLL(A) and automatically lock the pivot axle. If the operator slews the superstructure back towards the neutral position the algorithm will automatically unlock the pivot axle again, allowing the axle to pivot, whenever the machine stability allows to do so. In contrast to the situation in FIG. 2 herein inertial measurement units IMU on the superstructure, in general one IMU per moving part (e.g. on a boom, an arm and a bucket and a rotating upper carriage) may be preferred as well as a pressure sensor for load estimation in a boom cylinder of the working machine and a swing angle sensor in order to the determining the acting static and dynamic forces.

Figure 4:
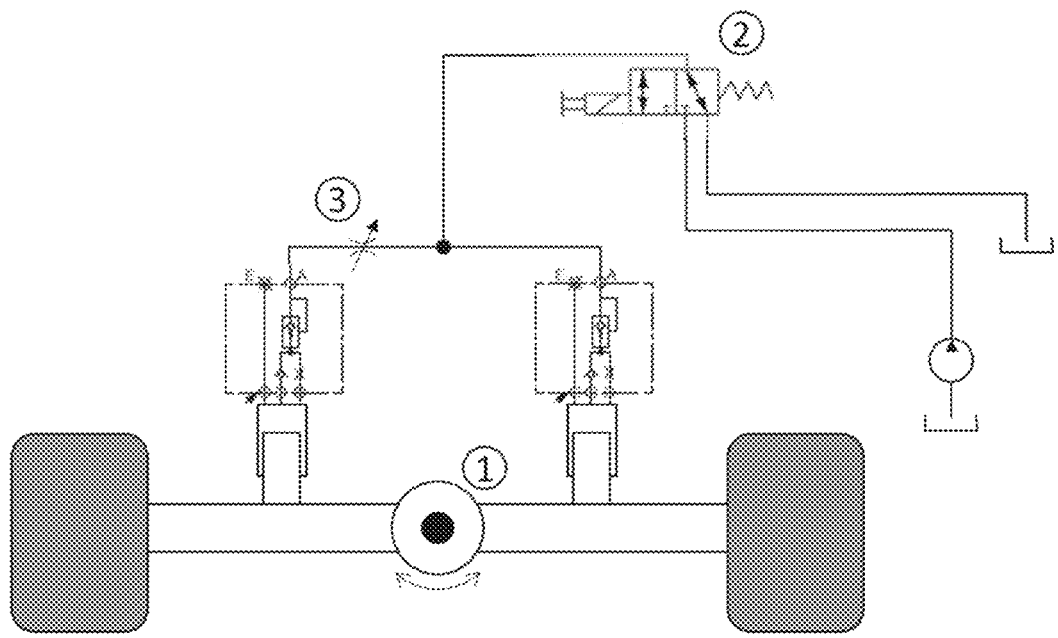
FIG. 4 is a schematic drawing of a pivot axle locking system according to the fifth aspect of the present disclosure.

FIG. 4 is a schematic drawing of parts of a pivot axle locking system according to the fifth aspect of the present disclosure. A pivot axle locking system comprises a pivot axle locking mechanism, herein comprising a hydraulic locking valve (2), and a pivot axle locking controller (not shown). The pivot axle locking system controls a hydraulic locking valve (2) which allows to lock or unlock the pivot axle (1) via a hydraulic logic. The hydraulic logic can be the same as in today's machine generation. To improve operator comfort when switching between the locked and unlocked state of the pivot axle an additional proportional throttle valve (3) might be required in addition to the hydraulic locking valve (2), which is herein a solenoid valve. The valve command for the locking valve is calculated by the pivot axle locking controller by balancing the torques around the currently relevant tipping line. The torques are derived from the static and dynamic forces acting on the machine in the current machine posture and motion state. All of this information is being provided by a multibody simulation model which gets herein IMU sensor signals, the swing angle sensor signal, vehicle speed and brake pressure as inputs. For enhanced comfort when switching between the locked and unlocked state dampening of the controller output signal and/or applying hysteresis to it might be useful. This would require a proportional throttle valve as well.

Figure 5:
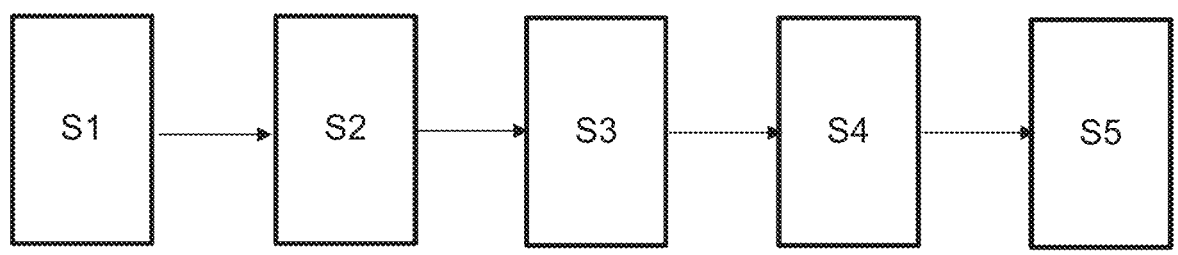
FIG. 5 is a schematic drawing of a locking control method according to the first aspect of the present disclosure.

FIG. 5 is a schematic drawing of a locking control method according to the first aspect of the present disclosure. The control method comprises as a first step S1 determining a current posture and motion state of the working machine and static and dynamic forces acting on the working machine. In some embodiments, determining a current posture and motion state of the working machine and static and dynamic forces comprises measuring vehicle acceleration and/or angular accelerations of an upper carriage and/or attachment parts of the working machine, vehicle speed and/or angular speed of the upper carriage and attachment parts, orientation of the attachment parts, swing angle and brake pressure and provide these measurements to the multibody simulation model. In step S2 a relevant tipping line based on a current locking status of a pivot axle of the working machine is determined. In step S3 torques acting on the working machine based on the information on current posture, motion state, static and dynamic forces are calculated. In S4 a control command for a pivot axle locking mechanism of the working machine based on the calculated torques and the tipping line is determined and in step S5 the control command is provided to the pivot axle locking mechanism.

The invention claimed is:

1. A locking control method for a pivot axle of a wheeled working machine comprising the steps:
   determining, using a multibody simulation model, a current posture and motion state of a working machine and static and dynamic forces acting on the working machine;
   determining a relevant tipping line based on a current locking status of a pivot axle of the working machine;
   calculating torques acting on the working machine based on information on the current posture, the motion state, and the static and dynamic forces;
   determining a control command for a pivot axle locking mechanism of the working machine based on the calculated torques and the tipping line; and
   providing the control command to the pivot axle locking mechanism.

2. The locking control method according to claim 1, wherein determining a current posture and motion state of the working machine and static and dynamic forces comprises measuring swing angle and orientation of attachment parts of the working machine and calculating an overall center of gravity (COG).

3. The locking control method according to claim 1, wherein determining a current posture and motion state of the working machine and static and dynamic forces comprises measuring vehicle acceleration and/or angular accelerations of an upper carriage and/or attachment parts of the working machine, vehicle speed and/or angular speed of the upper carriage and attachment parts, orientation of the attachment parts, swing angle and brake pressure and providing these measurements to the multibody simulation model, wherein angular acceleration, angular speed and orientation are measured via at least one inertial measurement unit.

4. The locking control method according to claim 1, wherein determining a current posture and motion state of the working machine comprises additionally measuring a pressure in a boom cylinder to determine a load attached.

5. The locking control method according to claim 1, wherein determining a control command comprises balancing the calculated torques around the relevant tipping line.

6. The locking control method according to claim 1, wherein a hysteresis is applied before providing the control command to the pivot axle locking mechanism or wherein a hysteresis signal is provided to the pivot axle locking mechanism.

7. A pivot axle locking controller configured to perform the steps of the locking control method according to claim 1.

8. A computer program comprising program code for performing the steps of the locking control method according to claim 1 when said computer program is run on a computer.

9. A computer readable medium carrying a computer program comprising program code for performing the steps of the locking control method according to claim 1 when said computer program is run on a computer.

10. A pivot axle locking system comprising:
    a pivot axle locking mechanism comprising a hydraulic locking valve, and
    a pivot axle locking controller configured to perform operations comprising:
       determining, using a multibody simulation model, a current posture and motion state of a working machine and static and dynamic forces acting on the working machine;
       determining a relevant tipping line based on a current locking status of a pivot axle of the working machine;
       calculating torques acting on the working machine based on information on the current posture, the motion state, and the static and dynamic forces;
       determining a control command for the pivot axle locking mechanism of the working machine based on the calculated torques and the tipping line; and
       providing the control command to the pivot axle locking mechanism.

11. The pivot axle locking system according to claim 10 further comprising at least one inertial measurement unit and a swing angle sensor, which are connected to the pivot axle locking controller.

12. The pivot axle locking system according to claim 10 further comprising a pressure sensor in a boom cylinder of the working machine.

13. The pivot axle locking system according to claim 10, wherein the hydraulic locking valve is a solenoid valve.

14. The pivot axle locking system according to claim 10, further comprising a proportional throttle valve.

15. A wheeled working machine with a pivot axle locking system according to claim 10.

* * * * *